US012586166B2

(12) United States Patent
Oniki et al.

(10) Patent No.: US 12,586,166 B2
(45) Date of Patent: Mar. 24, 2026

(54) IMAGE PROCESSING METHOD, IMAGE PROCESSING APPARATUS, AND STORAGE MEDIUM

(71) Applicant: CANON KABUSHIKI KAISHA, Tokyo (JP)

(72) Inventors: Takashi Oniki, Tochigi (JP); Norihito Hiasa, Tochigi (JP); Masakazu Kobayashi, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 286 days.

(21) Appl. No.: 18/457,894

(22) Filed: Aug. 29, 2023

(65) Prior Publication Data

US 2024/0070826 A1 Feb. 29, 2024

(30) Foreign Application Priority Data

Aug. 29, 2022 (JP) ................................. 2022-136370

(51) Int. Cl.
| | |
|---|---|
| *G06T 5/73* | (2024.01) |
| *G06T 3/4015* | (2024.01) |
| *G06T 11/60* | (2006.01) |
| *H04N 9/73* | (2023.01) |

(52) U.S. Cl.
CPC .............. *G06T 5/73* (2024.01); *G06T 3/4015* (2013.01); *G06T 11/60* (2013.01); *H04N 9/73* (2013.01)

(58) Field of Classification Search
CPC ........... G06T 11/60; G06T 2207/20081; G06T 2207/20084; G06T 3/4015; G06T 5/50; G06T 5/60; G06T 5/73; H04N 23/843; H04N 9/646; H04N 9/73
See application file for complete search history.

(56) References Cited

U.S. PATENT DOCUMENTS

| | | | | |
|---|---|---|---|---|
| 6,469,710 | B1 * | 10/2002 | Shum ...................... | G06T 15/04 |
| | | | | 382/284 |
| 12,260,510 | B2 * | 3/2025 | Park .......................... | G06T 3/04 |
| 2015/0348249 | A1 * | 12/2015 | Yamamoto .......... | G06F 3/04847 |
| | | | | 382/218 |

(Continued)

FOREIGN PATENT DOCUMENTS

| | | | | |
|---|---|---|---|---|
| CN | 112381743 A | * | 2/2021 | ............... G06T 7/90 |
| JP | 2013084247 A | | 5/2013 | |

OTHER PUBLICATIONS

Mikko Nuutinen et al., "A framework for measuring sharpness in natural images captured by digital cameras based on reference image and local areas," May 10, 2012, EURASIP Journal on Image and Video Processing 2012, 2012:8, pp. 1-12.*

(Continued)

*Primary Examiner* — Omar S Ismail
(74) *Attorney, Agent, or Firm* — Canon U.S.A., Inc. IP Division

(57) ABSTRACT

A method includes sharpening a first image to generate a second image, generating a first weight map based on the first image, generating a second weight map based on the second image, and generating a third image based on the first image, the second image, the first weight map, and the second weight map, wherein each of the first weight map and the second weight map indicate a weight of one of the first image and the second image in the generation of the third image.

16 Claims, 19 Drawing Sheets

(56)                    References Cited

U.S. PATENT DOCUMENTS

| | | | |
|---|---|---|---|
| 2015/0371420 A1* | 12/2015 | Yerushalmy | G06T 3/4038 |
| | | | 382/284 |
| 2017/0236317 A1* | 8/2017 | Yachi | H04N 23/95 |
| | | | 348/68 |
| 2018/0336665 A1* | 11/2018 | Miyauchi | H04N 1/62 |
| 2020/0410636 A1* | 12/2020 | Kim | G06T 3/4015 |
| 2021/0192262 A1* | 6/2021 | Yamanaka | G06V 30/40 |
| 2021/0365720 A1* | 11/2021 | Nakada | G06T 5/50 |
| 2021/0390747 A1* | 12/2021 | Feng | G06T 11/60 |
| 2022/0111839 A1* | 4/2022 | Jiang | G06T 7/593 |
| 2022/0284554 A1* | 9/2022 | Guerin | H04N 23/10 |
| 2023/0015945 A1* | 1/2023 | Kagalwall | G06V 20/69 |

OTHER PUBLICATIONS

Ce Liu et al., "Automatic Estimation and Removal of Noise from a Single Image," May 15, 2007, IEEE Transactions on Pattern Analysis and Machine Intelligence, vol. 30, No. 2, Feb. 2008, pp. 299-312.*

Bartlomiej Wronski et al., "Handheld Multi-Frame Super-Resolution, "Jul. 2019, ACM Trans. Graph., vol. 38, No. 4, Article 28, pp. 28:1-28:16.*

Takayuki Honda et al., "Multi-Frame RGB/NIR Imaging for Low-Light Color Image Super-Resolution," Jan. 13, 2020, IEEE Transactions on Computational Imaging, vol. 6, 2020, pp. 248-260.*

* cited by examiner

| 0 | 0.25 | 0 |
|---|---|---|
| 0.25 | 1 | 0.25 |
| 0 | 0.25 | 0 |

| 0.25 | 0.5 | 0.25 |
|---|---|---|
| 0.5 | 1 | 0.5 |
| 0.25 | 0.5 | 0.25 |

SPACE COORDINATES

SPACE COORDINATES

SPACE COORDINATES

IMAGE PROCESSING METHOD, IMAGE PROCESSING APPARATUS, AND STORAGE MEDIUM

BACKGROUND

Technical Field

The aspect of the embodiments relates to an image processing method using a machine learning model.

Description of the Related Art

An image processing method in which deconvolution processing is performed using a filter (e.g., a Wiener filter or an inverse filter) to correct the deterioration (blur correction) of a captured image due to aberration of an optical system is known. However, in the case of performing blur correction processing using a filter, adverse effects such as ringing and undershoot can occur in a portion (luminance saturation portion) where a pixel value is saturated in a captured image and in a peripheral portion of the luminance saturation portion.

Japanese Patent Application Laid-Open No. 2013-84247 discusses a method for generating an image in which adverse effects in the luminance saturation portion and the peripheral portion thereof are reduced by reducing the correction amount of blur correction based on a result of determination as to whether an area in the image corresponds to the luminance saturation portion or the peripheral portion thereof.

Although the method discussed in Japanese Patent Application Laid-Open No. 2013-84247 is capable of generating an image in which adverse effects in the luminance saturation portion and the peripheral portion thereof are reduced, because the correction amount of blur correction is reduced, a decrease in the effects of blur correction occurs as a result.

SUMMARY

A method includes sharpening a first image to generate a second image, generating a first weight map based on the first image, generating a second weight map based on the second image, and generating a third image based on the first image, the second image, the first weight map, and the second weight map, wherein each of the first weight map and the second weight map indicate a weight of one of the first image and the second image in the generation of the third image.

Further features of the disclosure will become apparent from the following description of exemplary embodiments with reference to the attached drawings.

BRIEF DESCRIPTION OF THE DRAWINGS

FIG. 7 illustrates graphs each illustrating correction processing according to the first exemplary embodiment.

FIG. 10 schematically illustrates an interpolation filter in demosaicing processing.

DESCRIPTION OF THE EMBODIMENTS

Figure 1:
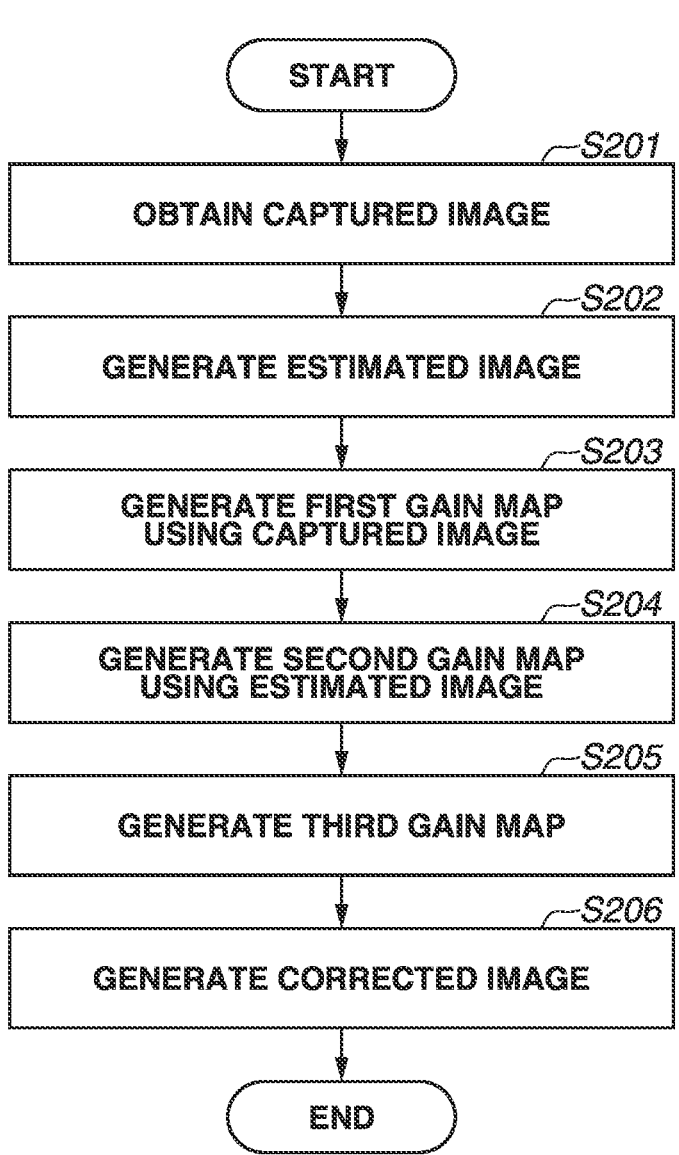
FIG. 1 is a flowchart illustrating an estimation process according to a first exemplary embodiment.

Exemplary embodiments of the disclosure will be described in detail below with reference to the drawings. In the drawings, the same members are denoted by the same reference numerals, and redundant descriptions thereof are omitted.

Prior to detailed description of exemplary embodiments, an outline of exemplary embodiments of the disclosure will be described. In an image processing method according to an exemplary embodiment of the disclosure, an estimated image is generated such that a blur due to an optical system in a captured image, which is obtained by capturing an image using the optical system and an image sensor, is sharpened using a machine learning model. Then, two weight maps are generated based on pixel values of the captured image and the estimated image, and a corrected image is generated based on the two weight maps, the captured image, and the estimated image.

The blur due to the optical system includes at least one of a blur due to aberration, diffraction, or defocusing, a blur due to an optical low-pass filter, and a decrease in aperture ratio of pixels in the image sensor.

A machine learning model according to the present exemplary embodiment is generated using, for example, a neural network, genetic programming, or a Bayesian network. Examples of the neural network include a convolutional neural network (CNN), a generative adversarial network (GAN), and a recurrent neural network (RNN).

The application of processing according to the present exemplary embodiment makes it possible to reduce adverse effects due to blur correction, while maintaining the effects of blur correction (sharpening).

Each image processing described in the following exemplary embodiments can be applied not only to sharpening processing, but also to image processing, such as contrast enhancement, brightness enhancement, defocus blur conversion, and lighting conversion, by appropriately changing learning data to be used for training a machine learning model.

Figure 2:
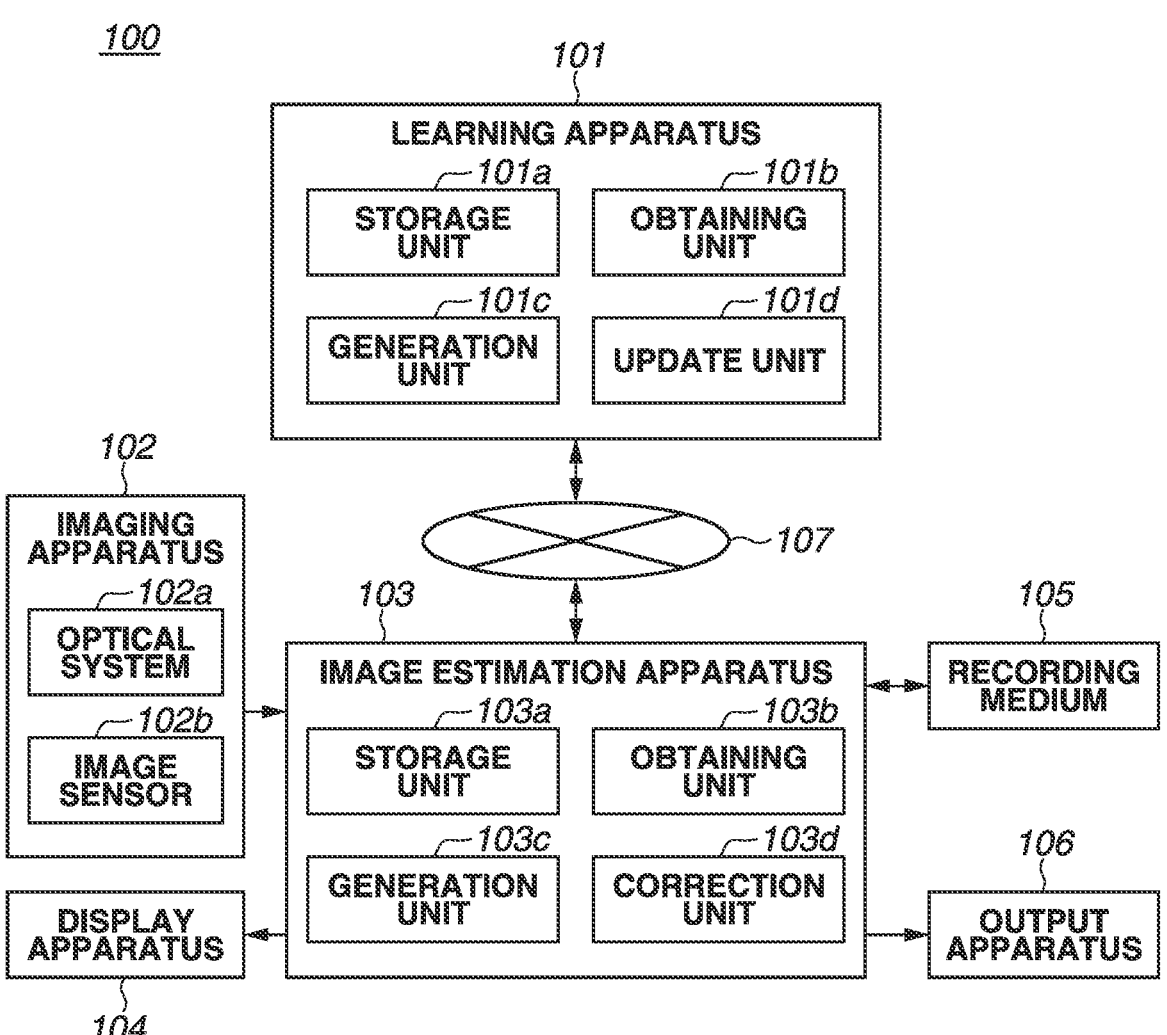
FIG. 2 is a block diagram illustrating an image processing system according to the first exemplary embodiment.

First, an image processing system 100 according to a first exemplary embodiment of the disclosure will be described with reference to FIGS. 2 and 3. FIG. 2 is a block diagram illustrating the image processing system 100 according to the first exemplary embodiment.

Figure 3:
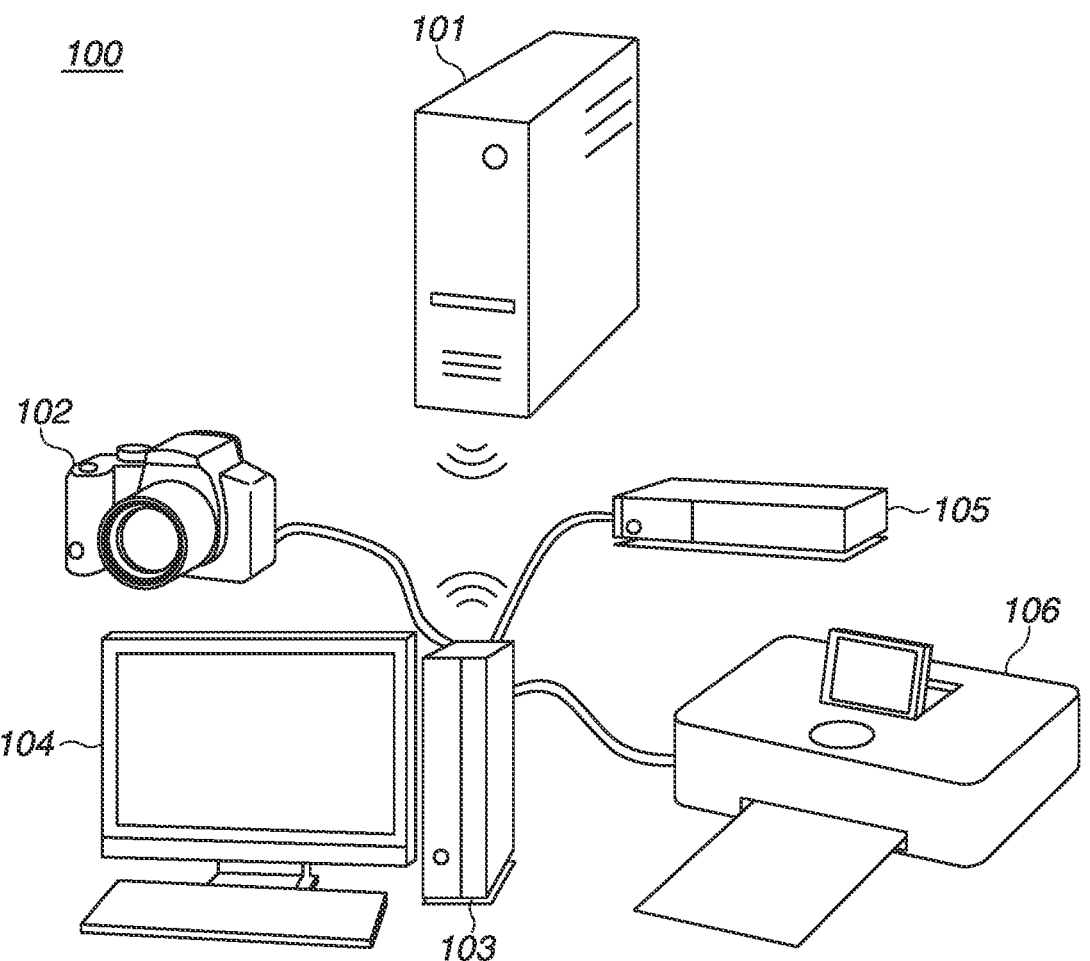
FIG. 3 is an external view of the image processing system according to the first exemplary embodiment.

FIG. 3 is an external view of the image processing system 100.

The image processing system 100 includes a learning apparatus 101, an imaging apparatus 102, an image estimation apparatus (image processing apparatus) 103, a display apparatus 104, a recording medium 105, an output apparatus 106, and a network 107.

The learning apparatus 101 executes a learning process (learning phase), and includes a storage unit 101a, an obtaining unit 101b, a generation unit 101c, and an update unit 101d. The obtaining unit 101b obtains a training image and a ground truth image. The generation unit 101c inputs the training image to a multi-layer neural network and generates an output image. The update unit 101d updates (learns) a weight of a machine learning model based on an error between the output image and the ground truth image calculated by the generation unit 101c. The learning phase will be described in detail below with reference to a flowchart. The weight of the learned machine learning model is stored in the storage unit 101a.

The imaging apparatus 102 includes an optical system 102a and an image sensor 102b. The optical system 102a collects light that enters the imaging apparatus 102 from an object space. The image sensor 102b receives (photoelectrically converts) light from an optical image (object image) formed via the optical system 102a, to thereby obtain a captured image. The image sensor 102b is, for example, a charge-coupled device (CCD) sensor or a complementary metal-oxide semiconductor (CMOS) sensor. The captured image obtained by the imaging apparatus 102 includes a blur due to aberration or diffraction of the optical system 102a, and noise due to the image sensor 102b.

The image estimation apparatus 103 executes an estimation process (estimation phase), and includes a storage unit 103a, an obtaining unit 103b, a generation unit 103c, and a correction unit 103d. The image estimation apparatus 103 generates an estimated image by performing blur correction processing on the captured image obtained using the machine learning model. The weight of the machine learning model is read out from the storage unit 103a. The weight of the machine learning model is learned by the learning apparatus 101. The image estimation apparatus 103 preliminarily reads out the weight from the storage unit 101a via the network 107, and stores the weight in the storage unit 103a. The weight may be stored as the value of the weight, or may be stored in an encoded form. Weight update processing and blur correction processing using the machine learning model will be described in detail below. The image estimation apparatus 103 includes a function for performing development processing and other image processing as needed. In this case, an image obtained by performing other image processing on the estimated image may be used as the output image. The function of generating the estimated image by the image estimation apparatus 103 may be implemented by one or more processors (processing units) such as central processing units (CPUs).

The estimated image (output image) is output to at least one of the display apparatus 104, the recording medium 105, and the output apparatus 106. The display apparatus 104 is, for example, a liquid crystal display or a projector. A user can perform an editing operation and the like while checking the image being processed through the display apparatus 104. The recording medium 105 is, for example, a semiconductor memory, a hard disk, or a server on the network 107. The output apparatus 106 is, for example, a printer.

Next, a weight (weight information) learning method (learned model production method) to be executed by the learning apparatus 101 according to the present exemplary embodiment will be described with reference to FIGS. 4 and 5.

Figure 4:
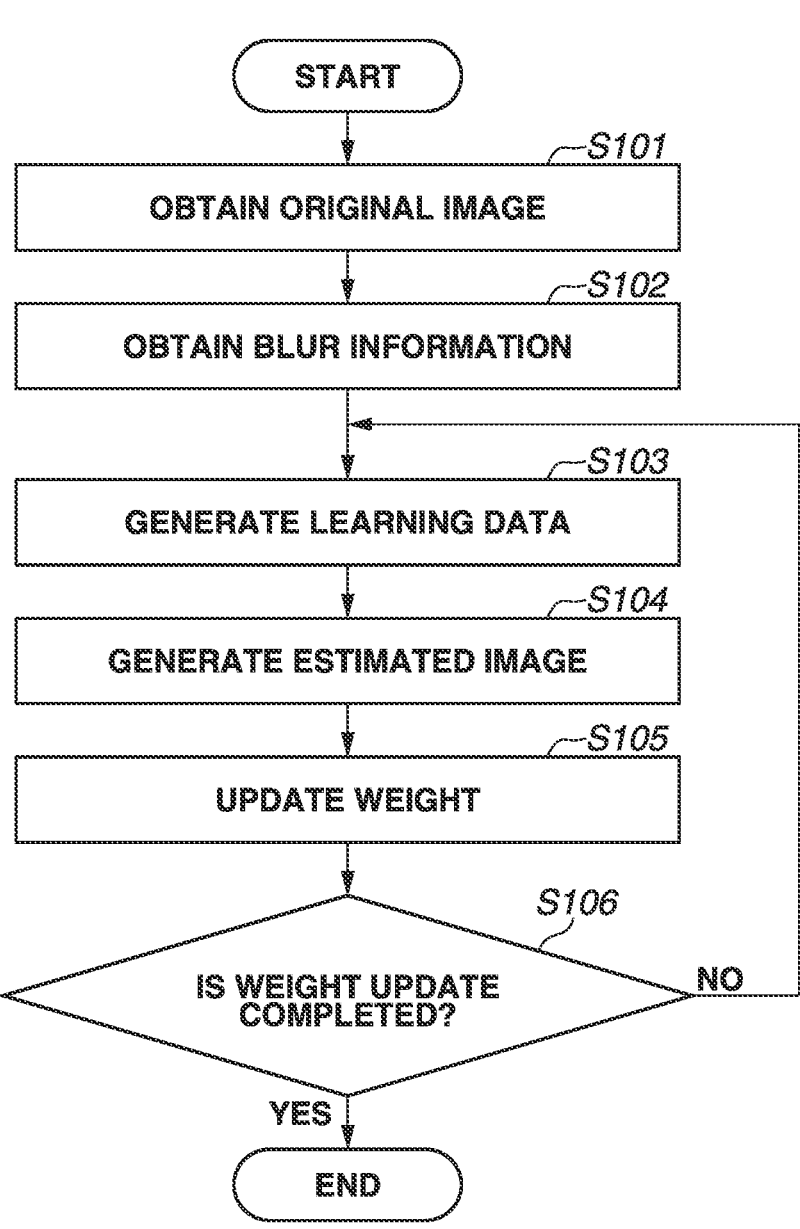
FIG. 4 is a flowchart illustrating a learning process according to the first exemplary embodiment.

FIG. 4 is a flowchart illustrating weight learning processing. Each step in FIG. 4 is mainly executed by the obtaining unit 101b, the generation unit 101c, or the update unit 101d in the learning apparatus 101. FIG. 5 illustrates a neural network learning flow according to the present exemplary embodiment.

In step S101, the obtaining unit 101b obtains an original image. In the present exemplary embodiment, the original image is a high-resolution (high-quality) image with a less blur due to aberration or diffraction of the optical system 102a. A plurality of original images is obtained and the original images include various objects such as edges with various intensities and directions, textures, gradations, and flat portions. Each original image may be a photographed image or an image generated by computer graphics (CG). In particular, in the case of using a photographed image as an original image, the image already includes a blur due to aberration or diffraction. Accordingly, the size of the image is reduced to reduce the effect of the blur, thereby obtaining a high-resolution (high-quality) image. If the original image includes sufficient high-frequency components, there is no need to reduce the size of the image. Each original image may include noise components. In this case, the noise included in the original image can be regarded as a part of an object, and thus the noise in the original image does not cause any issue. Each original image may include a signal value (luminance value, pixel value) higher than a luminance saturation value of the image sensor 102b. This is because in a case where the imaging apparatus 102 captures an image of an actual object under a specific exposure condition, the luminance of the image may not fall within the luminance saturation value.

In step S102, the obtaining unit 101b obtains a blur used to perform imaging simulation to be described below. The obtaining unit 101b first obtains imaging conditions corresponding to lens states (states of zooming, diaphragm, and in-focus distance) of the optical system 102a. Further, information about the blur determined based on imaging conditions and a screen position is obtained. The information about the blur is a point spread function (PSF) or an optical transfer function (OTF) of the optical system 102a, and can be obtained by optical simulation or measurement in the optical system 102a. Different blurs due to aberration or diffraction depending on lens states, an image height, and an azimuth are obtained for each original image. Thus, imaging simulation corresponding to a plurality of imaging conditions, image heights, and azimuths can be performed. If necessary, components such as the optical low-pass filter included in the imaging apparatus 102 may be added to the blur to be applied.

In step S103, the generation unit 101c generates learning data including ground truth data composed of a ground truth patch (ground truth image) and training data composed of a training patch (training image).

The ground truth patch and the training patch can be changed depending on the function to be learned and the effect of the function, and corresponding images may be used as the ground truth patch and the training patch. One or more ground truth patches are generated for one original image. A plurality of pairs of a ground truth patch and a training patch is used as learning data. In the present exemplary embodiment, each original image is an undeveloped RAW image, and the ground truth patch and the training patch are also RAW images. However, the ground truth patch and the training patch according to the present exemplary embodiment are not limited to RAW images, as long as the images include the same object. For example, a developed image, or a feature map obtained by converting an image as described below may be used. In the present exemplary embodiment, a plurality of original images stored in the storage unit 101a is used as objects, and imaging simulation is performed to thereby generate a plurality of pairs of a ground truth image and a training image with relatively different effects of blurs due to aberration or diffraction.

The term "patch" refers to an image including a prescribed number of pixels (e.g., 64×64 pixels).

The number of pixels in each ground truth patch need not necessarily be equal to the number of pixels in each training patch. In the present exemplary embodiment, mini-batch learning is used to learn a machine learning model. Accordingly, in step S103, a plurality of pairs of a ground truth patch and a training patch is generated. However, learning processing according to the present exemplary embodiment is not limited to this example. For example, online learning or batch learning may be used.

In step S104, the generation unit 101c inputs a training patch 11 to the machine learning model, thereby generating an estimated patch (estimated image) 12. Since mini-batch learning is used in the present exemplary embodiment, the estimated patch 12 corresponding to a plurality of training patches 11 is generated.

Figure 5:
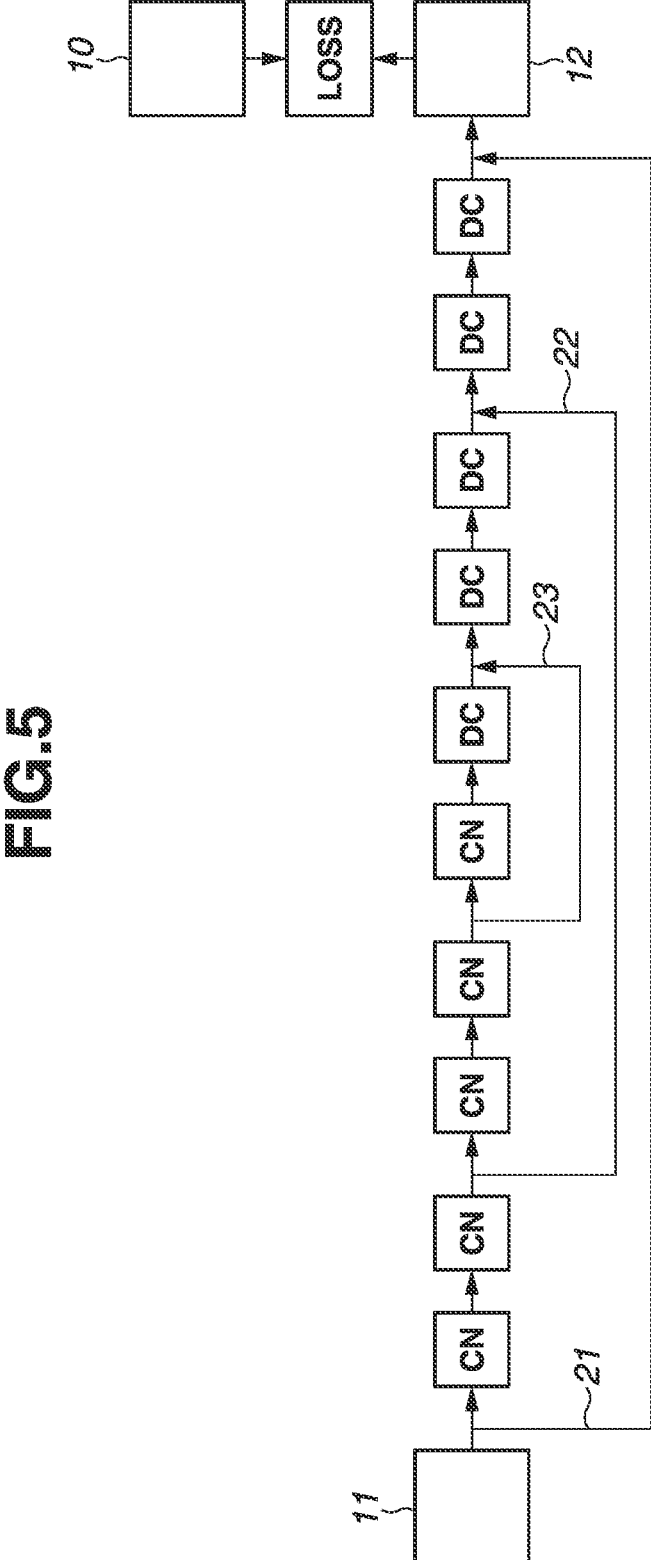
FIG. 5 illustrates a learning flow of a machine learning model according to the first exemplary embodiment.

FIG. 5 illustrates a learning phase flow, and corresponds to steps S104 and S105 in FIG. 4. The estimated patch 12 may be sharper than each training patch 11 and may match a ground truth patch (ground truth image) 10. In the present exemplary embodiment, the configuration of a neural network illustrated in FIG. 5 is used. However, the configuration of the neural network is not limited to this example.

In FIG. 5, "CN" represents a convolution layer and "DC" represents a deconvolution layer. Each of the convolution layer and the deconvolution layer calculates a convolution of an input and a filter and the sum with a bias, and perform a nonlinear transformation on the result using an activation function. Each component of the filter and an initial value of the bias are arbitrary and determined by random numbers in the present exemplary embodiment. As the activation function, for example, a Rectified Linear Unit (ReLU) or a sigmoid function can be used. The output of each layer except a last layer is called a feature map. Skip connections 22 and 23 combine feature maps output from discontinuous layers. A combination of the feature maps may be the sum of each element or may be connected in a channel direction (concatenation). The present exemplary embodiment adopts the sum of each element. The skip connection 21 generates the estimated patch 12 by taking the sum of the training patch 11 and estimated residuals of the training patch 11 and the ground truth patch 10. A plurality of estimated patches 12 is generated for each of the plurality of training patches 11.

In step S105, the update unit 101d updates the weight of the neural network based on an error between the estimated patch 12 and the ground truth patch 10. In this case, the weight includes a filter component and a bias of each layer. The weight is updated using a backpropagation method. However, the weight updating method according to the disclosure is not limited to this method. In mini-batch learning, errors between the plurality of ground truth patches 10 and the estimated patches 12 respectively corresponding to the ground truth patches 10 are calculated, and the weight is updated based on the errors. As an error function (loss function), for example, an L2 norm or an L1 norm can be used.

In step S106, the update unit 101d determines whether the weight update is completed. The completion of the weight update can be determined based on, for example, whether the number of iterations of learning (weight update) has reached a prescribed value, or whether a weight variation amount during updating is smaller than a prescribed value. If it is determined that the weight update is not completed (NO in step S106), the processing returns to step S103 to obtain a plurality of new ground truth patches and training patches. On the other hand, if it is determined that the weight update is completed (YES in step S106), the learning apparatus 101 (update unit 101d) terminates the learning processing and stores the weight information in the storage unit 101a.

Figure 6:
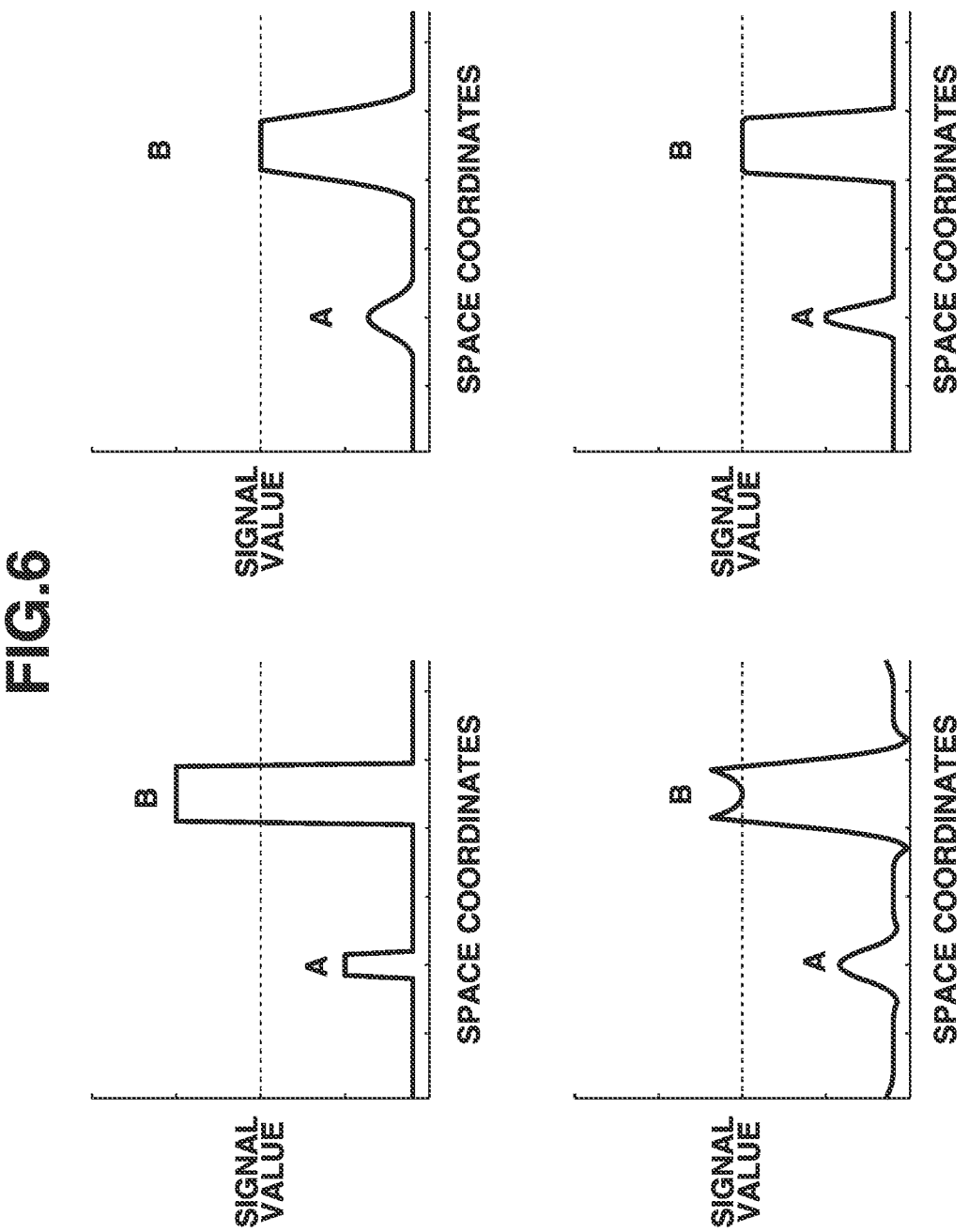
FIG. 6 illustrates correction processing of related art.

Correction processing of related art will now be described with reference to FIG. 6. FIG. 6 illustrates graphs each illustrating correction processing of related art. In FIG. 6, the vertical axis represents a signal value and the horizontal axis represents space coordinates. Each dotted line in FIG. 6 indicates a saturation luminance value. In the present exemplary embodiment, each signal value is a pixel value. The upper left graph in FIG. 6 illustrates the luminance of each of objects A and B. The upper right graph in FIG. 6 illustrates an example of an image (captured image) including the objects A and B, and the image is deteriorated due to the aberration of the optical system 102a. Further, the luminance of the object B is greater than or equal to the luminance saturation value, and thus the signal is clipped at the luminance saturation value. The lower left graph in FIG. 6 illustrates an example of an image on which blur correction processing is performed by performing deconvolution processing on the captured image illustrated in the lower right graph in FIG. 6. The lower right graph in FIG. 6 illustrates an example of an image obtained by performing blur correction processing on the captured image illustrated in the upper right graph in FIG. 6 using the machine learning model. In the present exemplary embodiment, the blur correction processing is performed using the machine learning model trained by the method illustrated in FIG. 4.

In the lower left graph in FIG. 6, deconvolution processing is performed using a filter such as a Wiener filter or an inverse filter. Instead of deconvolution processing, the following processing may be performed. That is, a Fourier transform may be performed on the image and the filter on the frequency space, and the calculation results may be multiplied. In this processing, the deterioration of the object A due to aberration can be reduced compared with the captured image illustrated in the upper right graph in FIG. 6. However, adverse effects such as overshoot and undershoot are more likely to occur in an area including a luminance saturation portion, like the object B. The overshoot that occurs in the vicinity of edges of the luminance saturation portion illustrated in the lower right graph in FIG. 6 is actually clipped at the luminance saturation value, and thus does not appear on the image. However, the undershoot that occurs in a dark portion appears on the image. A black level (brightness of the dark portion) in the captured image is offset from zero. If undershoot occurs, the undershoot is clipped so as to prevent the offset value from becoming less than or equal to zero. However, this offset value (OB value) is lower than the black level. An area with the offset value lower than the black level is much darker than the peripheral area, which causes adverse effects in the image. The adverse effects occur due to missing of information when the pixel values of the object do not fall within the dynamic range of the image sensor 102*b* and are clipped.

However, since the convolution processing as illustrated in the lower left graph in FIG. 6 is a linear operation, it is difficult to avoid such an issue in principle. Accordingly, a machine learning model can be used to reduce the adverse effects. For example, the convolution operation can also be used in a neural network, while a non-linear function can be used for the activation function portion. Non-linear processing using a machine learning model obtained by performing appropriate learning enables more flexible processing. In this case, the machine learning model may cause to learn an image including the luminance saturation portion using learning data. In the learning data, the captured image including the luminance saturation portion and the image with less aberration and with no adverse effects in the vicinity of the luminance saturation portion are used as the ground truth image, thereby making it possible to perform correction processing in which adverse effects due to correction can be reduced, while maintaining the effects of correcting the aberration due to the optical system 102*a* in both the objects A and B as illustrated in the lower right graph in FIG. 6.

Learning processing is performed using the captured image including the luminance saturation portion, thereby determining whether the luminance saturation portion is present in the machine learning model, and the processing is changed depending on the determination result. However, if there is an error in the determination, the error causes an adverse effect on the result.

Figure 7:
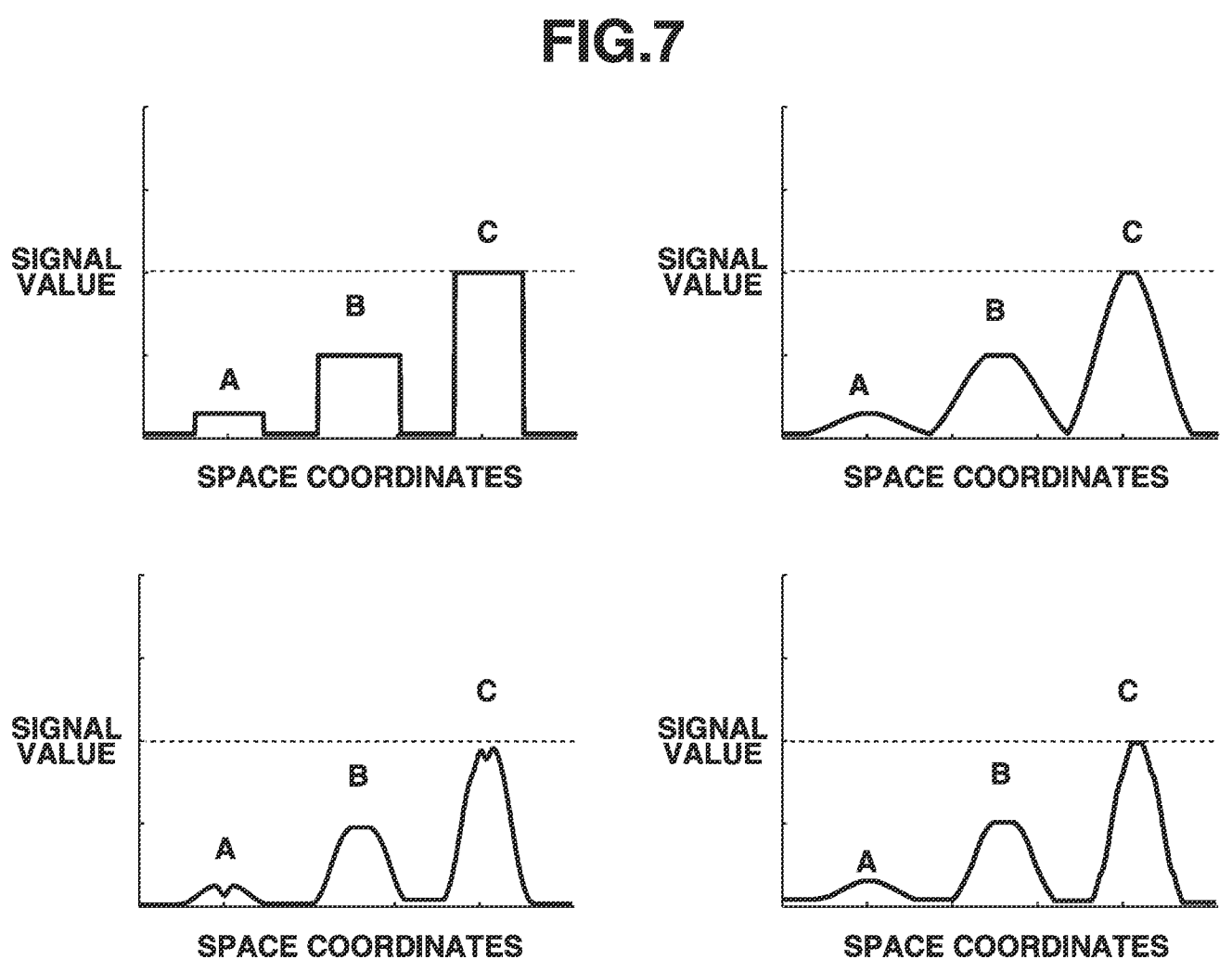

Next, correction processing according to the present exemplary embodiment will be described with reference to FIG. 7. FIG. 7 illustrates graphs each illustrating correction processing according to the present exemplary embodiment. In FIG. 7, the vertical axis represents a signal value and the horizontal axis represents space coordinates. Each dotted line in FIG. 7 indicates the saturation luminance value. In the present exemplary embodiment, each signal value is a pixel value. The upper left graph in FIG. 7 illustrates the luminance of each of the object A, the object B, and an object C. FIG. 7 illustrates an example of capturing images of three objects, that is, the object A having a lower luminance, the object B having a luminance value that is about a half of the luminance saturation value, and the object C having a luminance value in the vicinity of the luminance saturation value. The object C illustrated in the upper left graph in FIG. 7 is an example in which an erroneous determination is likely to be made. It is difficult to distinguish the object having flat pixel values in the vicinity of the luminance saturation value from the object which has pixel values greater than or equal to the luminance saturation value and in which the pixel values are clipped at the luminance saturation value. The upper right graph in FIG. 7 illustrates an example of an image (captured image) including the objects A, B, and C, and the image is deteriorated due to the aberration of the optical system 102*a*. The lower left graph in FIG. 7 illustrates an example of an image on which blur correction processing is performed on the captured image illustrated in the upper right graph in FIG. 6 using the above-described machine learning model. The lower right graph in FIG. 7 is an example of an image obtained by performing processing on the captured image illustrated in the upper right graph in FIG. 6 by the method according to the present exemplary embodiment.

FIGS. 6 and 7 illustrate schematic graphs, and thus the images illustrated in FIGS. 6 and 7 are evaluated in a state where noise is not included. However, actually captured images are influenced by noise. If an area in which no luminance saturation has occurred is erroneously determined to be the luminance saturation area due to the effect of noise, the area is corrected to a large extent. The lower left graph in FIG. 7 shows the result that the machine learning model determines the object C to be the area in which luminance saturation occurs and the object C is overcorrected. The lower left graph in FIG. 7 illustrates an example of processing to be performed during blur correction. In this example, processing of reducing signals (pixel values) is performed, so that the pixel values are decreased, which causes an adverse effect.

Figure 8:
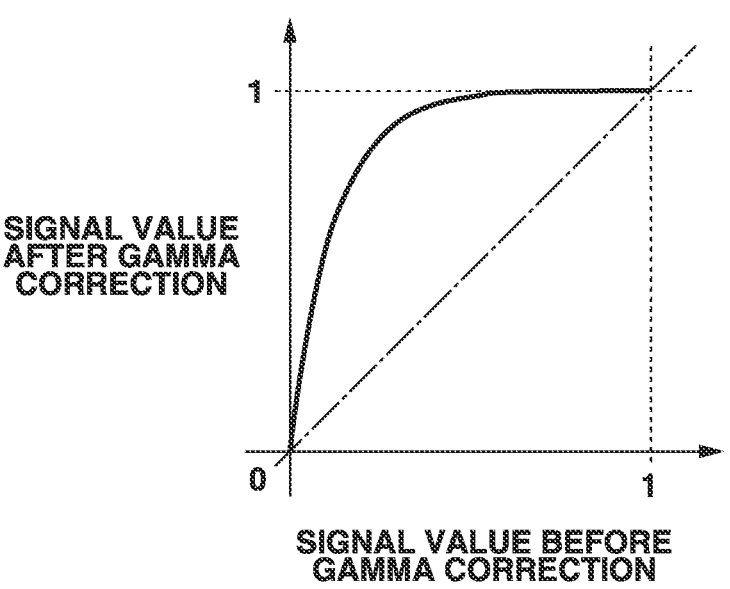
FIG. 8 illustrates graphs each illustrating a gamma correction.

Such an adverse effect occurs not only on the high-luminance side, but also on the low-luminance side. The object A illustrated in the lower left graph in FIG. 7 illustrates an example of such a case. The adverse effect occurring on the low-luminance side is related to a gamma correction. The gamma correction will be described with reference to FIG. 8. FIG. 8 illustrates a relationship between pixel values before and after the gamma correction. When pixel values before correction are represented by a straight line (dashed-dotted line in FIG. 8) with a slope 1 in FIG. 8, the pixel values after correction are represented by a curve (gamma curve). The gamma correction is processing to be performed in development processing to obtain a developed image from a RAW image, which is an undeveloped image data, output from the image sensor 102*b*. The actual processing is processing of performing exponentiation on input pixel values. For example, 1/2.2 is used as the index of exponentiation. Each pixel value corrected in the gamma correction includes a value greater than or equal to the pixel value before correction, and each pixel value on the low-luminance side varies more greatly than that on the high-luminance side. In other words, the adverse effect on the low-luminance side in the state of a RAW image can become more conspicuous (emphasized) in the state of a developed image due to the gamma correction.

In the present exemplary embodiment, in order to reduce such adverse effects, two gain maps corresponding to the high-luminance side and the low-luminance side, respectively, are created and a final corrected image is generated using the two gain maps. The lower right graph in FIG. 7 illustrates an example of the corrected image generated using the captured image, the estimated image, and the gain maps. Even in a case where the adverse effects, such as undershoot, occur in the estimated image, the image processing method according to the present exemplary embodiment can be executed to reduce the adverse effects due to the blur correction, while maintaining the effects of the blur correction.

Next, corrected image generation processing (correction processing) to be executed by the image estimation apparatus 103 according to the present exemplary embodiment will be described with reference to FIG. 1. FIG. 1 is a flowchart illustrating the corrected image (third image) generation processing. Each step in FIG. 1 is mainly executed by the obtaining unit 103*b*, the generation unit 103*c*, or the correction unit 103*d*.

First, in step S201, the obtaining unit 103*b* obtains a captured image (first image). The first image is an undeveloped RAW image, like in learning processing. In the present exemplary embodiment, the first image is transmitted from the imaging apparatus 102.

In step S202 (first step), the generation unit 103c executes sharpening processing on the captured image using a machine learning model and obtains an estimated image (second image). Information about the weight of the machine learning model is transmitted from the learning apparatus 101 and is stored in the storage unit 103a.

In step S203 (second step), the generation unit 103c generates a first gain map (first weight map). In the present exemplary embodiment, the first gain map is generated based on the pixel values of the captured image, and represents the weight on the estimated image during corrected image generation processing. The first gain map includes weight information about each pixel corresponding to the corrected image. The first gain map is used to reduce the adverse effects in the low-luminance portion (dark portion).

Figure 9:
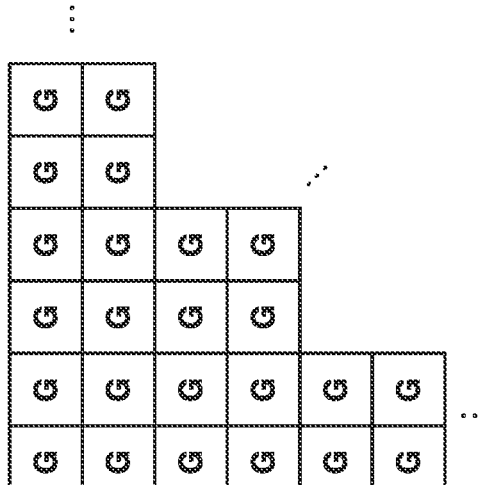
FIG. 9 illustrates demosaicing processing on "G".
Figure 11:
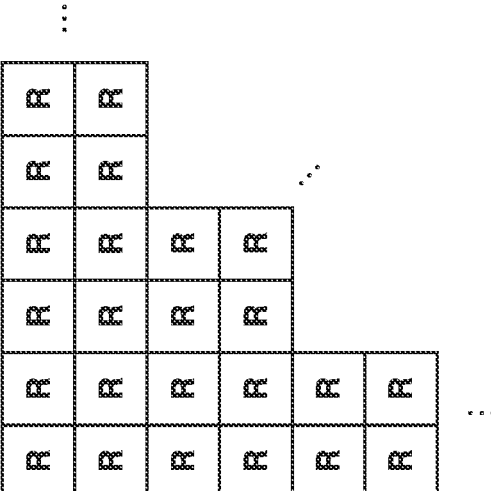
FIG. 11 illustrates demosaicing processing on "R".
Figure 11:
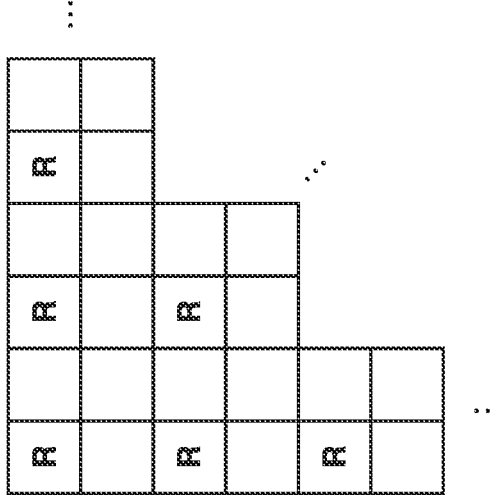

Each processing to be performed on the captured image will now be described with reference to FIGS. 9, 10, and 11.

Each processing to be performed on the captured image is processing to be performed on the captured image, as needed, during generation of the first gain map. Examples of the processing include demosaicing processing, white balance adjustment processing, and normalization processing. FIG. 9 illustrates color components of the captured image. FIG. 10 schematically illustrates an interpolation filter in demosaicing processing. FIG. 11 illustrates demosaicing processing on "R". In the present exemplary embodiment, the captured image is a Bayer array image as illustrated in the left figure in FIG. 9. In this case, R, G, and B represent pixel values (luminance values) of red, green, and blue, respectively. However, the color array of the captured image is not limited to this example.

Demosaicing processing to be performed on the captured image represented by the array illustrated in the left figure in FIG. 9 will now be described. The Bayer array includes two types of "G", that is, G1 and G2, and thus the demosaicing processing to be performed on "G" is different from the demosaicing processing to be performed on "R" and "B". The middle figure in FIG. 9 illustrates a state where only G1 and G2 are extracted from the left figure in FIG. 9. In the case of performing demosaicing processing on "G" in the left figure in FIG. 9, "G" is extracted as illustrated in the middle figure in FIG. 9, and then linear interpolation processing is performed. In the present exemplary embodiment, linear interpolation processing is performed using a filter illustrated in the left figure in FIG. 10. The left figure in FIG. 10 illustrates a filter to be used for demosaicing processing on "G". However, the values in the left figure in FIG. 10 are not particularly limited. Convolution processing is performed on "G" in the middle figure in FIG. 9 by using the filter illustrated in the left figure in FIG. 10, thereby making it possible to generate information about "G" after interpolation processing as illustrated in the right figure in FIG. 9.

Next, demosaicing processing to be performed on "R" and "B" will be described. There is only one type of "R" and one type of "B", and similar processing can be applied. Accordingly, in the present exemplary embodiment, the processing to be performed on "R" will be described. The left figure in FIG. 11 illustrates a state where only "R" in the Bayer array illustrated in the left figure in FIG. 9 is extracted. The middle figure in FIG. 11 illustrates a color difference of "R" before demosaicing processing. The difference of "G" after demosaicing processing illustrated in the right figure in FIG. 9 is taken only in the pixels in which "R" is present in the left figure in FIG. 11. In the present exemplary embodiment, color difference information is calculated by taking the difference of "G" from "R". To interpolate the color difference information, convolution processing is performed using a filter illustrated in the right figure in FIG. 10 on the color difference illustrated in the middle figure in FIG. 11, thereby calculating color difference information corresponding to all pixels. The right figure in FIG. 10 illustrates the filter for performing interpolation processing, and the values illustrated in the right figure in FIG. 10 are not particularly limited. The right figure in FIG. 11 illustrates information about "R" after demosaicing processing, and "G" (corresponding to the right figure in FIG. 9) is added to the color difference obtained after the convolution processing using the filter illustrated in the right figure in FIG. 10, thereby making it possible to calculate the color difference information.

While demosaicing processing to be performed on "R" is described above, demosaicing processing can also be executed on "B" in the same manner. In the present exemplary embodiment, interpolation processing is performed using the color difference with respect to "R" and "B", but instead interpolation processing may be directly performed on "R" and "B". The demosaicing processing may be executed by using not only simple interpolation processing, but also adaption processing using a gradient of RGB values or the like.

Next, white balance adjustment processing to be performed on the captured image will be described. The white balance adjustment processing is processing in which gain processing is performed on each of RGB color components output from the image sensor 102b to match luminance levels so that an achromatic color portion in each object exhibits an achromatic color in the output image. The execution of white balance adjustment processing makes it possible to generate an image in which the color of each object can be accurately reproduced, regardless of the color characteristics of the image sensor 102b, and the color of each object is closer to the actual color of the object. In the present exemplary embodiment, more accurate gain maps can be generated by executing the white balance adjustment processing.

As coefficients (white balance coefficients) used for the white balance adjustment processing, coefficients set during image capturing are used. In general, white balance coefficients are present for each of the RGB color components, and thus the white balance adjustment processing can be executed by multiplying the white balance coefficients by the color components of the captured image respectively corresponding to the coefficients. In this case, if the black level is offset, the white balance adjustment processing may be performed after subtracting the offset amount. If the white balance coefficients for G1 and G2 are individually set, the average of the white balance coefficients may be used as the white balance coefficient for "G". As the white balance coefficients, not only white balance coefficients set during image capturing, but instead a combination of other coefficients may be used. For example, if the imaging apparatus 102 used for image capturing includes a function of automatically determining and correcting the type of a light source (auto white balance), coefficient data is attached to the captured image and the coefficient data may also be used for white balance adjustment processing.

Next, normalization processing to be performed on the captured image will be described. In the normalization processing according to the present exemplary embodiment, RGB maximum values are first obtained for each pixel of the captured image including RGB luminance values of three colors. In the present exemplary embodiment, the maximum values are used, but instead an index such as a median value, an average value, or a minimum value may be used. Thus, a single value is set for each pixel to thereby prevent the weight from varying among RGB color components. Scaling is performed on two-dimensional data composed of RGB maximum values such that the black level is set to 0 and the luminance saturation value is set to 1. Then, the gain maps are calculated based on the two-dimensional data obtained after scaling. In the present exemplary embodiment, scaling is performed based on the black level and the luminance saturation value. However, the scaling method is not limited to this example. For example, scaling may be performed by dividing data by 2 bytes of data so that 2 bytes of data indicate "1".

Figure 12:
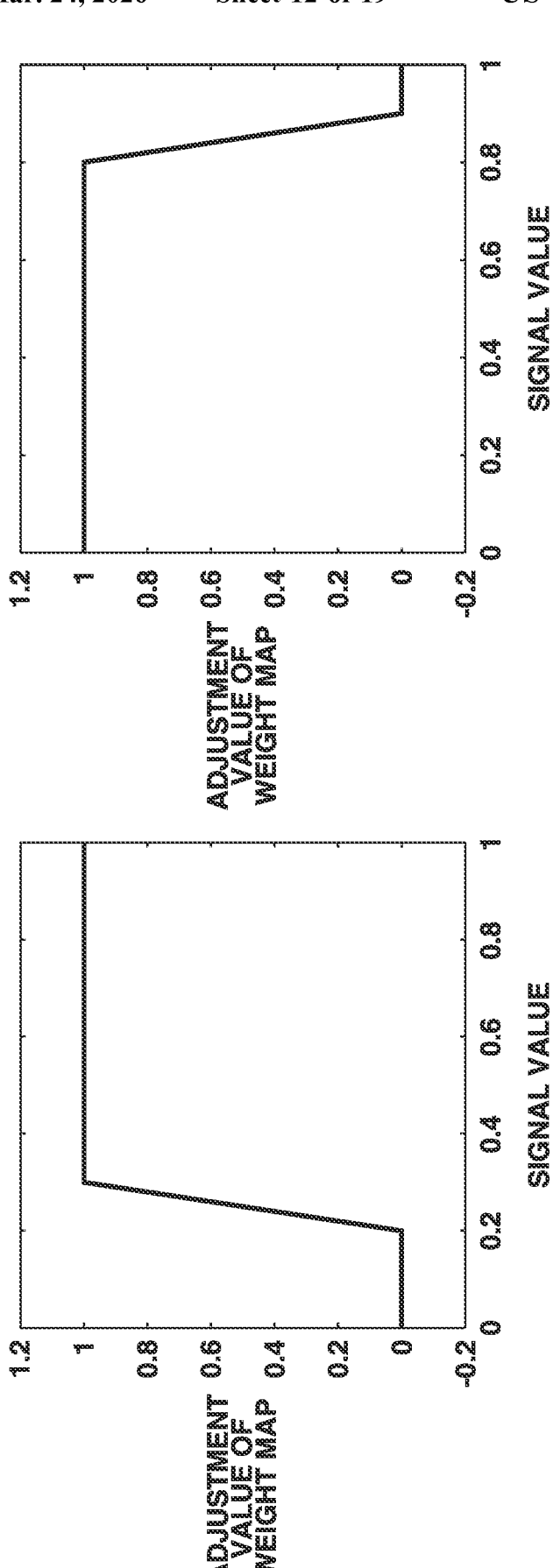
FIG. 12 illustrates a response function according to the first exemplary embodiment.

FIG. 12 illustrates a response function according to the present exemplary embodiment. In FIG. 12, the horizontal axis represents two-dimensional data after scaling, and the vertical axis represents an adjustment value of a weight map. In the present exemplary embodiment, the weight of the estimated image used to generate the corrected image can be calculated by inputting signal values (pixel values) to the response function. The left graph in FIG. 12 illustrates a response function (first response function) used to generate the first gain map. The right graph in FIG. 12 illustrates a response function (second response function) used to generate a second gain map.

In the left graph in FIG. 12, the output value increases (the weight of the estimated image increases) as the pixel value in the two-dimensional data obtained after scaling increases. On the other hand, in the right graph in FIG. 12, the output value decreases (the weight of the estimated value decreases) as the pixel value in the two-dimensional data obtained after scaling increases.

In the left graph in FIG. 12, two thresholds are set to 0.2 and 0.3, respectively. If the signal value is less than or equal to 0.2, the weight of the estimated image is 0. If the signal value is greater than or equal to 0.3, the weight of the estimated image is 1. During this interval, the weight linearly changes. In the present exemplary embodiment, two thresholds are set and each interval linearly changes. However, a non-linear function such as a sigmoid function may be used as the response function, without setting the thresholds. The two thresholds are not limited to these values, and any other values may be used. The area with a larger weight of the estimated image is increased by setting the thresholds, thereby making it possible to obtain the corrected image with less aberration. On the other hand, the area with a smaller weight of the estimated image is increased by setting the thresholds, thereby making it possible to obtain the corrected image with less adverse effects due to the aberration correction. The response function may be generated based on information about the correction effects. Information about a correction intensity indicates the intensity of aberration correction during corrected image generation processing, and is used to determine the thresholds in the response function. The information about the correction intensity is set by, for example, the user.

Figure 13:
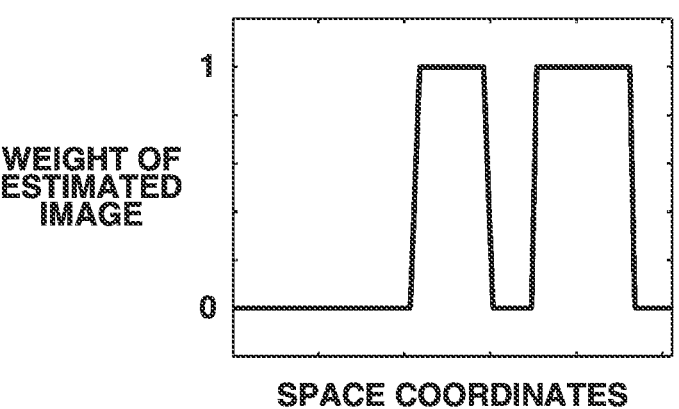
FIG. 13 illustrates schematic graphs each illustrating a weight map.
Figure 13:
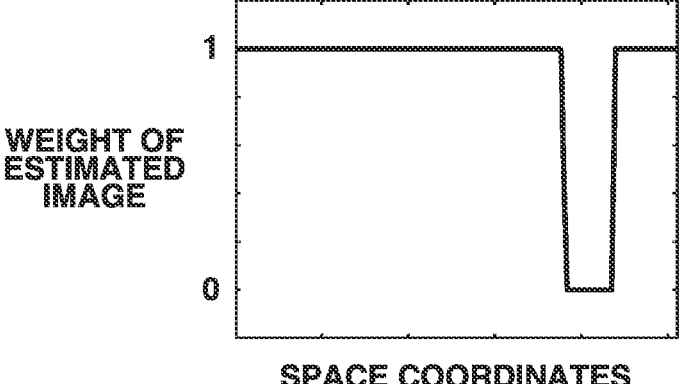
Figure 13:
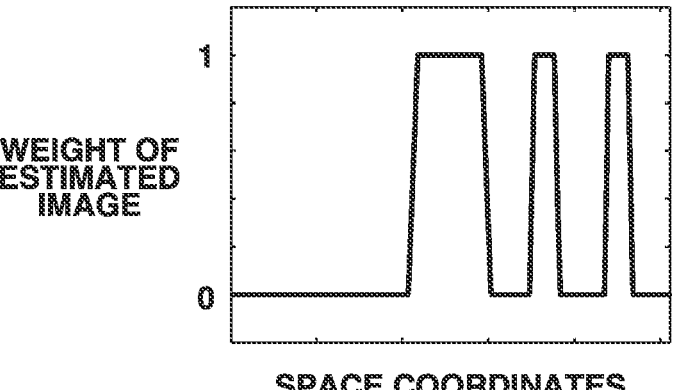

The upper graph in FIG. 13 is a schematic graph of the first gain map generated using the captured image illustrated in the upper right graph in FIG. 7. In the upper graph in FIG. 13, the vertical axis represents the weight of the estimated image, and the horizontal axis represents an area (space coordinates) in the image.

In step S204 (third step), the generation unit 103c generates the second gain map (second weight map). In the present exemplary embodiment, the second gain map is generated based on the pixel values of the estimated image, and represents the weight on the estimated image during corrected image generation processing. The second gain map includes weight information about each pixel corresponding to the corrected image. The second gain map is used to reduce the adverse effects in the high-luminance portion (light portion).

The calculation of the second gain map differs from the calculation of the first gain map in that the estimated image is used in place of the captured image. On the other hand, demosaicing processing, white balance adjustment processing, and normalization processing are similar to those in the calculation of the first gain map, and thus the descriptions thereof are omitted.

In the right graph in FIG. 12, two thresholds are set to 0.8 and 0.9, respectively. If the space coordinates are less than or equal to 0.8, the weight of the estimated image is 1. If the space coordinates are greater than or equal to 0.9, the weight of the estimated image is 0. During this interval, the weight changes linearly. In the present exemplary embodiment, the two thresholds are set and each interval linearly changes. However, a non-linear function such as a sigmoid function may be used as the response function, without setting the thresholds. The two thresholds are not limited to these values, and any other values may be used. A corrected image with less aberration can be obtained by increasing the area with a larger weight of the estimated image by setting the thresholds. On the other hand, a corrected image with less adverse effects due to aberration correction can be obtained by increasing the area with a smaller weight of the estimated image by setting the thresholds. The response function may be generated based on information about the correction effects. The information about the correction intensity indicates the intensity of the aberration correction during corrected image generation processing, and is used to determine the thresholds in the response function. The information about the correction intensity is set by, for example, the user.

The middle graph in FIG. 13 is a schematic graph of the second gain map generated using the estimated image illustrated in the lower left graph in FIG. 7. In the middle graph in FIG. 13, the vertical axis represents the weight of the estimated image and the horizontal axis represents an area (space coordinates) in the image.

In step S205 (fourth step), the generation unit 103c combines the first gain map and the second gain map, thereby obtaining a gain map (third weight map) used to generate the corrected image.

The lower graph in FIG. 13 is a schematic graph of the gain map generated using the first gain map and the second gain map. In the present exemplary embodiment, the value of the corresponding area in the first gain map is compared with the value of the corresponding area in the second gain map, and the smaller value is used to generate a third gain map. The third gain map may be calculated by multiplying or averaging the two gain maps.

In step S206, the correction unit 103d generates (combines) the corrected image based on the captured image, the estimated image, and the third gain map. In the present exemplary embodiment, the corrected image is generated by weighted-averaging the captured image and the estimated image based on the weight of the estimated image indicated by the third gain map.

With this configuration, the corrected image as illustrated in the lower right graph in FIG. 7 can be generated. In the corrected image illustrated in the lower right graph in FIG. 7, undershoot occurring in the objects C and A can be reduced compared with the estimated image illustrated in the lower left graph in FIG. 7. Also, regarding the sharpening effect, the correction effect equivalent to the correction effect in the estimated image illustrated in the lower left graph in FIG. 7 can be maintained.

The corrected image is generated based on the captured image and the estimated image using the gain maps by executing the correction processing described above, thereby making it possible to reduce the adverse effects due to blur correction, while maintaining the effects of blur correction.

In the present exemplary embodiment, the first gain map and the second gain map are each calculated based on the pixel values of the captured image and the pixel values of the estimated image. A low-luminance area is considerably influenced by noise and has high sensitivity because a large gain is applied to the low-luminance area due to the gamma correction. Accordingly, in one embodiment, a low-luminance area may be set based on the captured image before sharpening processing. On the other hand, in order to maintain the effects of aberration correction in the luminance saturation area and the peripheral area thereof, the low-luminance area may be set based on the estimated image after sharpening processing.

The pixel values obtained when the weight of the estimated image (or the captured image) is 0.5 in the first response function and the second response function illustrated in FIG. 12 are referred to as a first threshold and a second threshold, respectively. Specifically, in FIG. 12, the first threshold is 0.25 and the second threshold is 0.85. In the present exemplary embodiment, the first gain map indicates the weight for reducing the adverse effect on the low-luminance side, and the second gain map indicates the weight for reducing the adverse effect on the high-luminance side. Accordingly, in the case of the weight on the estimated image as illustrated in FIG. 12, the first threshold is smaller than the second threshold. In one embodiment, this configuration may be desirable in terms of reducing the adverse effect of ringing originating in the estimated image on the generated weight map. However, the first and second thresholds are not limited to these values. This magnitude relationship between the first and second thresholds is based on the premise that the same reference value is used during scaling.

In the present exemplary embodiment, the gain maps are calculated based on the pixel values of the captured image and the estimated image. However, the gain maps may be calculated based on any other information, as needed. Any other information is, for example, information regarding the performance of the optical system 102a during image capturing. The performance of the optical system 102a is calculated using, for example, the PSF or OTF of the optical system 102a.

If the optical system 102a has low performance, the correction amount of blur correction using the machine learning model increases, so that adverse effects such as undershoot and ringing are more likely to occur. The PSF varies depending on a position in the captured image. Accordingly, in an area with a large image height in which the spread of the PSF is more likely to increase and the performance is more likely to decrease, the occurrence of the adverse effects can be prevented by reducing the correction amount on the area at the center of the screen.

While the exemplary embodiment described above illustrates an example of the blur determination method according to the disclosure, the blur determination method can be modified and changed in various ways within the scope of the disclosure.

Next, an image processing system 200 according to a second exemplary embodiment will be described with reference to FIGS. 14 and 15. The second exemplary embodiment differs from the first exemplary embodiment in that the image processing system 200 obtains original images using an optical system 221 and an image sensor 222 in an imaging apparatus 202 and an image estimation unit 223 performs image processing. The second exemplary embodiment also differs from the first exemplary embodiment in that the third gain map is not calculated in the processing of generating the corrected image (third image).

Figure 14:
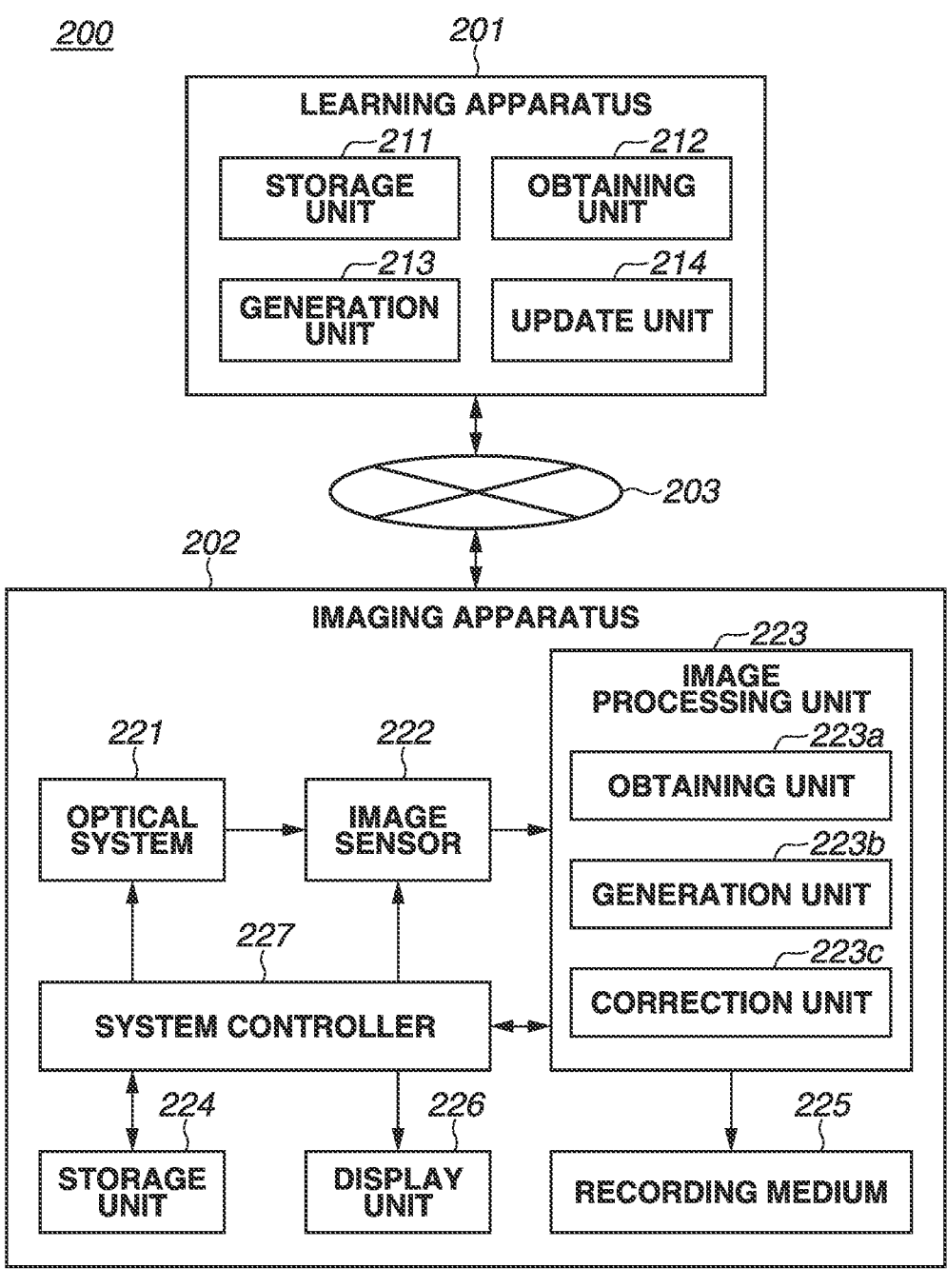
FIG. 14 is a block diagram illustrating an image processing system according to a second exemplary embodiment.
Figure 15:
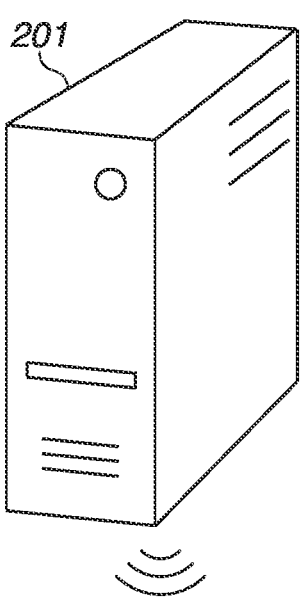
FIG. 15 is an external view of the image processing system according to the second exemplary embodiment.
Figure 15:
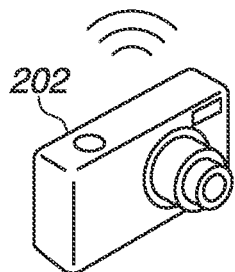

FIG. 14 is a block diagram illustrating the image processing system 200 according to the second exemplary embodiment. FIG. 15 is an external view of the image processing system 200.

The image processing system 200 includes a learning apparatus 201 and the imaging apparatus 202. The learning apparatus 201 and the imaging apparatus 202 are configured to communicate with each other via a network 203.

The learning apparatus 201 includes a storage unit 211, an obtaining unit 212, a generation unit (generate unit) 213, and an update unit (learning unit) 214, and learns a weight (weight information) for performing blur correction using a neural network. The learning apparatus 201 according to the present exemplary embodiment is similar to the learning apparatus 101 according to the first exemplary embodiment, and thus the description thereof is omitted.

The imaging apparatus 202 includes the optical system 221, the image sensor 222, the image estimation unit 223, a storage unit 224, a recording medium 225, a display unit 226, and a system controller 227. The imaging apparatus 202 according to the present exemplary embodiment obtains a captured image by capturing an image of an object space, generates an estimated image based on the captured image using a machine learning model, and generates a corrected image by weighted-averaging the captured image and the estimated image.

The image estimation unit 223 includes an obtaining unit 223a, a generation unit 223b, and a correction unit 223c. The obtaining unit 223a, the generation unit 223b, and the correction unit 223c correspond to the obtaining unit 103b, the generation unit 103c, and the correction unit 103d, respectively, in the first exemplary embodiment. The weight information is preliminarily learned by the learning apparatus 201, and is stored in the storage unit 211. The imaging apparatus 202 reads out weight information from the storage unit 211 via the network 203, and stores the weight information in the storage unit 224. The corrected image generated by the image estimation unit 223 is stored in the recording medium 225. The captured image already stored in the recording medium 225 may be read out and corrected by the image estimation unit 223. If an instruction to display the corrected image is issued from the user, the stored corrected image is read out and displayed on the display unit 226. The above-described series of control processing is carried out by the system controller 227.

A learning method of a machine learning model to be executed by the learning apparatus 201 according to the present exemplary embodiment is similar to that according to the first exemplary embodiment, and thus the description thereof is omitted.

Figure 16:
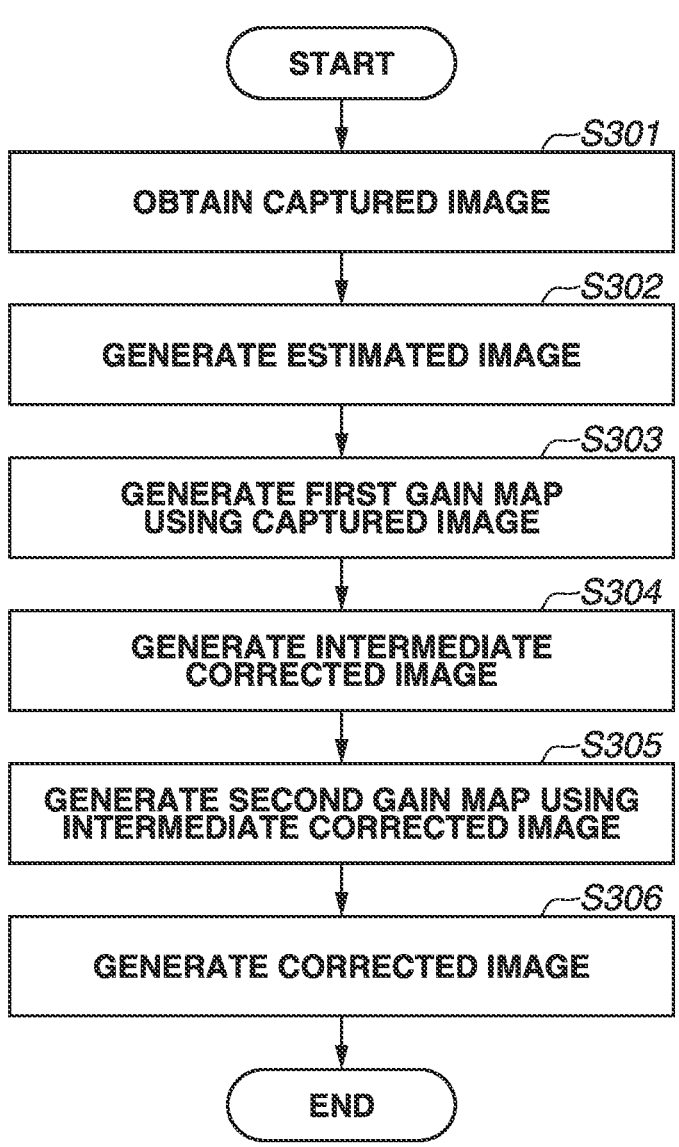
FIG. 16 is a flowchart illustrating an estimation processing according to the second exemplary embodiment.

Next, corrected image generation processing to be executed by the image estimation unit 223 according to the present exemplary embodiment will be described with reference to FIG. 16. FIG. 16 is a flowchart illustrating corrected image generation processing. Each step in FIG. 16 is mainly executed by the obtaining unit 223a, the generation unit 223b, or the correction unit 223c. Steps S301 to S303 are similar to steps S201 to S203, respectively, in the first exemplary embodiment.

In step S304, the correction unit 223c generates an intermediate corrected image using the first gain map, the captured image, and the estimated image. The intermediate corrected image generated using the first gain map, the captured image, and the estimated image includes the objects A and B as illustrated in the lower right graph in FIG. 7. However, since the estimated image is used as a part of the area of the object C, undershoot remains as illustrated in the lower left graph in FIG. 7. In the intermediate corrected image that is obtained by weighted-averaging the captured image and the estimated image using the first gain map, the adverse effect on the low-luminance side is reduced.

Next, in step S305, the generation unit 223b generates the second gain map.

The second gain map according to the second exemplary embodiment is similar to the second gain map generated in step S204 according to the first exemplary embodiment, and thus the description thereof is omitted.

Next, in step S306, the correction unit 103d generates the corrected image using the captured image, the intermediate corrected image, and the second gain map. The captured image and the intermediate corrected image are weight-averaged using the second gain map, thereby reducing the undershoot remaining in the area of the object C having high luminance in the intermediate corrected image. As a result, the corrected image in which the estimated image correction effects can be maintained while the adverse effects are reduced as illustrated in the lower right graph in FIG. 7 can be generated. In the present exemplary embodiment, the intermediate corrected image is calculated using the first gain map, and then the corrected image is generated using the intermediate corrected image and the second gain map. However, the order of executing the processing using the first gain map and the processing using the second gain map may be reversed. The same beneficial effects can be obtained even when the second gain map is first applied, and then the corrected image is generated using the estimated image, the intermediate corrected image, and the first gain map.

The correction processing described above is executed to generate the corrected image based on the captured image and the estimated image using the gain maps, thereby making it possible to reduce the adverse effects due to aberration correction, while maintaining the effects of aberration correction.

Figure 17:
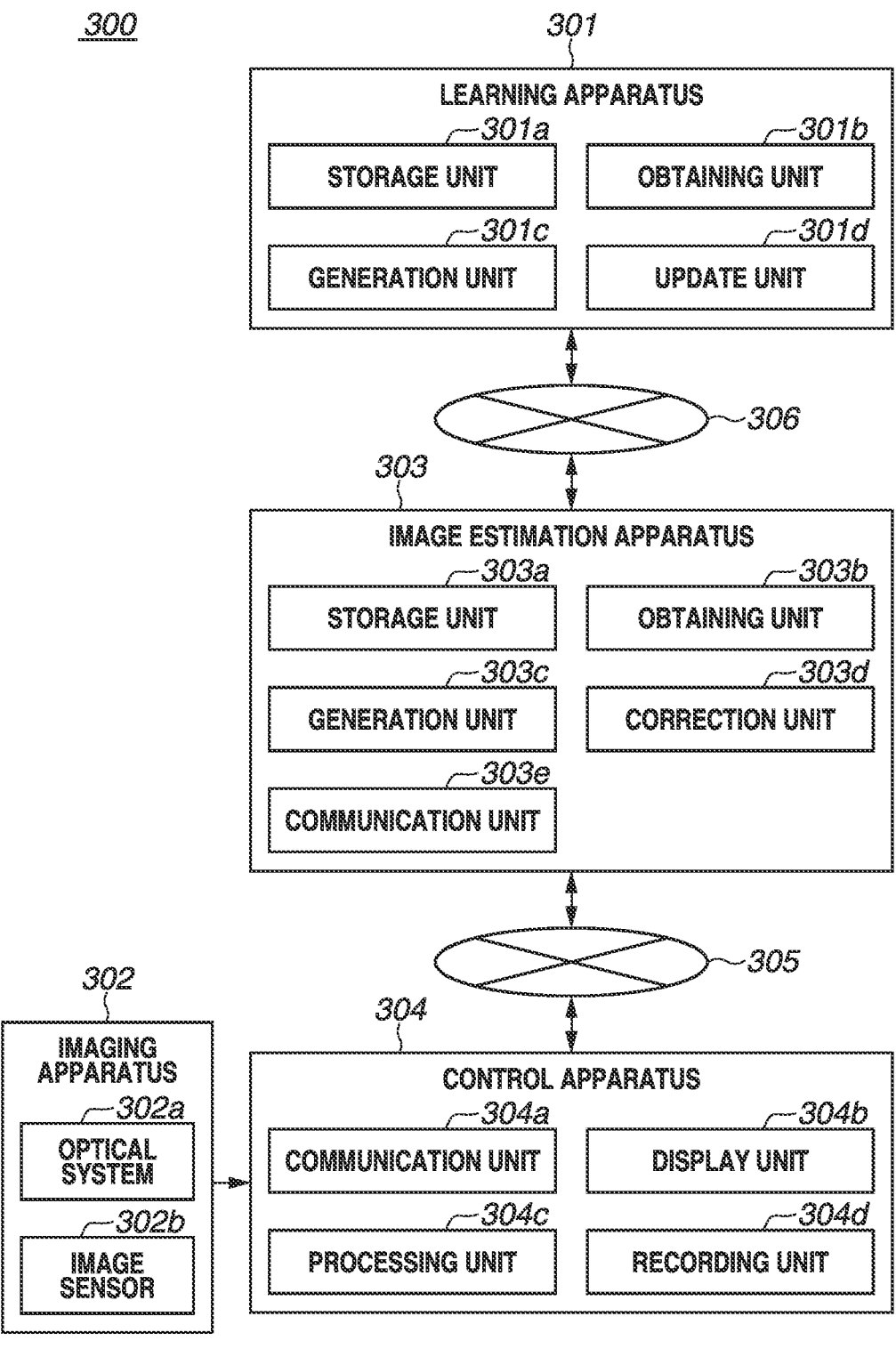
FIG. 17 is a block diagram illustrating an image processing system according to a third exemplary embodiment.
Figure 18:
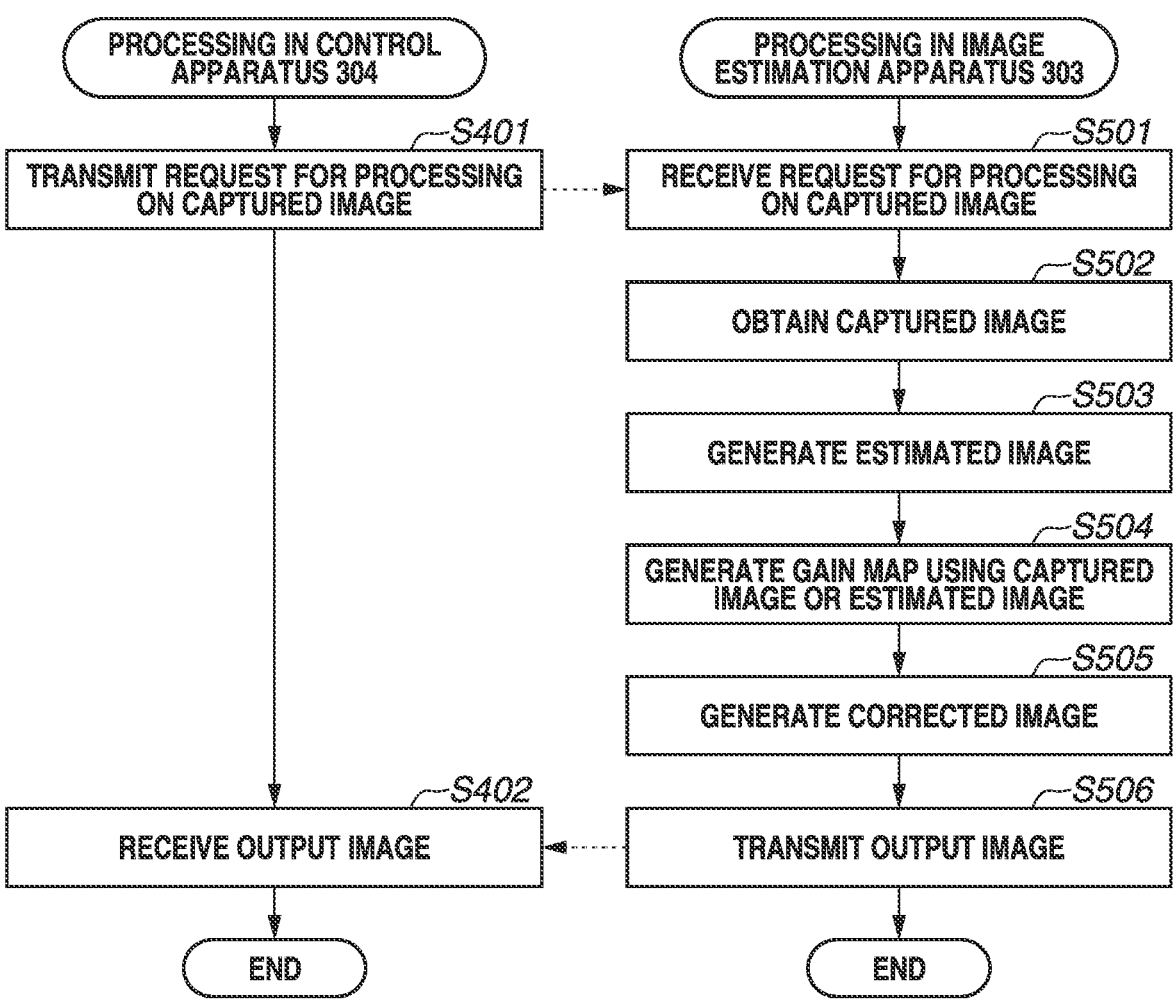
FIG. 18 is a flowchart illustrating an estimation process according to the third exemplary embodiment.

Next, an image processing system 300 according to a third exemplary embodiment will be described with reference to FIGS. 17 and 18. The third exemplary embodiment differs from the first exemplary embodiment in that the image processing system 300 includes a control apparatus (first apparatus) 304 that obtains a captured image from an imaging apparatus 302 and transmits a request for image processing on the captured image to an image estimation apparatus (second apparatus) 303. FIG. 17 is a block diagram illustrating the image processing system 300 according to the third exemplary embodiment. FIG. 18 is a flowchart illustrating corrected image generation processing according to the third exemplary embodiment.

The image processing system 300 includes a learning apparatus 301, the imaging apparatus 302, the image estimation apparatus 303, and the control apparatus 304. In the present exemplary embodiment, the learning apparatus 301 and the image estimation apparatus 303 are servers. The control apparatus 304 is, for example, a user terminal (a personal computer or a smartphone). The control apparatus 304 is connected to the image estimation apparatus 303 via a network 305. The control apparatus 304 and the image estimation apparatus 303 are configured to communicate with each other. The image estimation apparatus 303 is connected to the learning apparatus 301 via a network 306. The image estimation apparatus 303 and the learning apparatus 301 are configured to communicate with each other.

The configuration of the learning apparatus 301 and the configuration of the imaging apparatus 302 are respectively similar to the configuration of the learning apparatus 101 and the configuration of the imaging apparatus 102 according to the first exemplary embodiment, and thus the descriptions thereof are omitted.

The image estimation apparatus 303 includes a storage unit 303a, an obtaining unit 303b, a generation unit 303c, a correction unit 303d, and a communication unit (reception unit) 303e. The storage unit 303a, the obtaining unit 303b, the generation unit 303c, and the correction unit 303d are respectively similar to the storage unit 103a, the obtaining unit 103b, the generation unit 103c, and the correction unit 103d according to the first exemplary embodiment. The communication unit 303e includes a function for receiving a request transmitted from the control apparatus 304, and a function for transmitting an output image generated by the image estimation apparatus 303 to the control apparatus 304.

The control apparatus 304 includes a communication unit (transmission unit) 304a, a display unit 304b, a processing unit 304c, and a recording unit 304d. The communication unit 304a includes a function for transmitting a request for causing the image estimation apparatus 303 to execute processing on the captured image to the image estimation apparatus 303, and a function for receiving the output image processed by the image estimation apparatus 303. The display unit 304b includes a function for displaying various information. Examples of the information to be displayed by the display unit 304b include the captured image to be transmitted to the image estimation apparatus 303, and the output image received from the image estimation apparatus 303. The processing unit 304c includes a function for further performing image processing on the output image received from the image estimation apparatus 303. The recording unit 304d records the captured image obtained from the imaging apparatus 302, the output image received from the image estimation apparatus 303, and the like.

Next, image processing according to the present exemplary embodiment will be described. The image processing according to the present exemplary embodiment is started in response to an image processing start instruction issued by the user via the control apparatus 304, and the image processing is executed by the image estimation apparatus 303.

First, an operation of the control apparatus 304 will be described. In step S401, the control apparatus 304 transmits a request to perform processing on the captured image to the image estimation apparatus 303. A method for transmitting the captured image to be processed to the image estimation apparatus 303 is not particularly limited. For example, the captured image may be updated to the image estimation apparatus 303 simultaneously in step S401, or may be uploaded to the image estimation apparatus 303 prior to step S401. The captured image that is stored in a server different from the image estimation apparatus 303 may be used. In step S401, the control apparatus 304 may transmit identification (ID) information or the like for authenticating the user, as well as the request to perform processing on the captured image.

In step S402, the control apparatus 304 receives the output image generated in the image estimation apparatus 303. The output image is the corrected image obtained by weighted-averaging the captured image and the estimated image, like in the first exemplary embodiment.

Next, an operation of the image estimation apparatus 303 will be described. In step S501, the image estimation apparatus 303 receives the request to perform processing on the captured image transmitted from the control apparatus 304. The image estimation apparatus 303 executes processing of step S502 and subsequent steps based on the request to perform processing on the captured image. The weight information according to the present exemplary embodiment is information (learned model) learned by the method (FIG. 4) similar to that in the first exemplary embodiment. The image estimation apparatus 303 may obtain the weight information from the learning apparatus 301, or may obtain the weight information that is preliminarily obtained from the learning apparatus 301 and stored in the storage unit 303a.

Steps S502 and S503 are respectively similar to steps S201 to S202 according to the first exemplary embodiment.

In step S504, the generation unit 303c generates a gain map (fourth weight map).

In the present exemplary embodiment, the gain map is generated based on the captured image or the estimated image. The generation unit 303c performs each processing (e.g., demosaicing processing, white balance adjustment processing, and normalization processing) on the captured image or the estimated image, as needed, like in the first exemplary embodiment, and generates the gain map using a response function.

Figure 19:
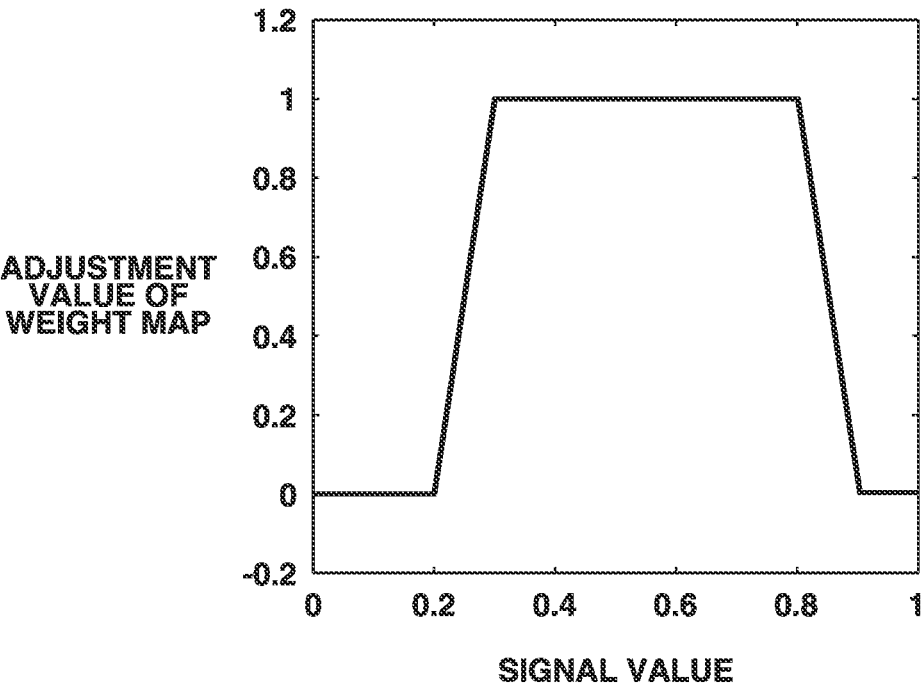
FIG. 19 illustrates a response function according to the third exemplary embodiment.

FIG. 19 illustrates the response function according to the present exemplary embodiment. In FIG. 19, the horizontal axis represents two-dimensional data obtained after scaling and the vertical axis represents the adjustment value for the weight map. In the present exemplary embodiment, thresholds for the response function are set to 0.2, 0.3, 0.8, and 0.9, respectively. As illustrated in FIG. 19, if the signal value is less than or equal to 0.2 or greater than or equal to 0.9, the weight of the estimated image is 0. If the threshold is greater than or equal to 0.3 and less than or equal to 0.8, the weight of the estimated image is 1. In intervals other than the above-described intervals, the weight linearly changes. The threshold values are not limited to these values. The corrected image with less aberration can be obtained by increasing the area with a large weight of the estimated image by setting the thresholds. On the other hand, the corrected image with less adverse effects due to aberration correction can be obtained by increasing the area with a smaller weight of the estimated image by setting the thresholds. The use of the response function as described above makes it possible to reduce the weight of the estimated image on the low-luminance area and the high-luminance area so as to reduce the adverse effects caused in the corrected image obtained by blur correction. The response function may be generated based on information regarding the correction effects. The calculation amount can be reduced compared with other exemplary embodiments in which a plurality of gain maps is generated.

In step S505, the image estimation apparatus 303 transmits the output image to the control apparatus 304.

The correction processing described above is executed to generate the corrected image based on the captured image and the estimated image using the gain maps, thereby making it possible to reduce the adverse effects due to blur correction, while maintaining the effects of blur correction.

In the present exemplary embodiment, the control apparatus 304 issues a request to perform processing on a specific image. Actual image processing is performed by the image estimation apparatus 303. Accordingly, if the user terminal is used as the control apparatus 304, the processing load on the user terminal can be reduced. This configuration enables the user to obtain the output image with low processing load.

Other Exemplary Embodiments

The disclosure can also be implemented by the following processing. That is, a program for implementing one or more functions according to the above-described exemplary embodiments is supplied to a system or apparatus via a network or storage medium, and one or more processors in a computer of the system or apparatus read out and execute the program. The disclosure can also be implemented by a circuit (e.g., an application-specific integrated circuit (ASIC)) for implementing one or more functions according to the exemplary embodiments.

According to the exemplary embodiments, it is possible to provide the image processing method, the image processing apparatus, and the program that are capable of reducing adverse effects due to blur correction, while maintaining the effects of blur correction.

While the exemplary embodiments of the disclosure are described above, the disclosure is not limited to these exemplary embodiments. Various modifications and changes can be made within the scope of the disclosure.

OTHER EMBODIMENTS

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-136370, filed Aug. 29, 2022, which is hereby incorporated by reference herein in its entirety.

What is claimed is:

1. An image processing method comprising:
sharpening a first image to generate a second image;
generating a first weight map based on the first image;
generating a second weight map based on the second image;
generating a third image based on the first image, the second image, the first weight map, and the second weight map; and
generating a third weight map based on the first weight map and the second weight map,
wherein each of the first weight map and the second weight map indicate a weight of one of the first image and the second image in the generation of the third image, and
wherein the third image is generated by weighted-averaging the first image and the second image using the third weight map.

2. The image processing method according to claim 1, wherein the second image is generated by sharpening the first image using a machine learning model.

3. An image processing method comprising:
sharpening a first image to generate a second image;
generating a first weight map based on the first image;
generating a second weight map based on the second image;
generating a third image based on the first image, the second image, the first weight map, and the second weight map; and
generating an intermediate corrected image based on the first image, the second image, and the first weight map,
wherein each of the first weight map and the second weight map indicate a weight of one of the first image and the second image in the generation of the third image, and
wherein the third image is generated based on the first image, the second weight map, and the intermediate corrected image.

4. The image processing method according to claim 1, wherein white balance adjustment processing is performed on the first image and the second image.

5. The image processing method according to claim 1, wherein demosaicing processing is performed on the first image and the second image.

6. An image processing method comprising:
sharpening a first image to generate a second image;
generating a first weight map based on the first image;
generating a second weight map based on the second image;
generating a third image based on the first image, the second image, the first weight map, and the second weight map,
wherein each of the first weight map and the second weight map indicate a weight of one of the first image and the second image in the generation of the third image,
wherein the first weight map is generated using a first response function representing a relationship between a pixel value of the first image and an adjustment value of the first weight map, and
wherein the second weight map is generated using a second response function representing a relationship between a pixel value of the second image and an adjustment value of the second weight map.

7. The image processing method according to claim 6, wherein the pixel value of the second image in a case where the weight of the first image and the weight of the second image are equal in the second response function is greater than the pixel value of the first image in a case where the weight of the first image and the weight of the second image are equal in the first response function.

8. An image processing method comprising:
sharpening a first image to generate a second image;
generating a first weight map based on the first image;
generating a second weight map based on the second image;
generating a third image based on the first image, the second image, the first weight map, and the second weight map,
wherein each of the first weight map and the second weight map indicate a weight of one of the first image and the second image in the generation of the third image,
wherein the first image is obtained by capturing an image using an optical system, and
wherein the third image is generated using a fourth weight map based on information regarding performance of the optical system.

9. The image processing method according to claim 8, wherein the information regarding the performance of the optical system is one of a point spread function and an optical transfer function of the optical system.

10. A storage medium storing a program for causing a computer to execute an image processing method, the image processing method comprising:
sharpening a first image to generate a second image;
generating a first weight map based on the first image;
generating a second weight map based on the second image; and
generating a third image based on the first image, the second image, the first weight map, and the second weight map;
generating a third weight map based on the first weight map and the second weight map,
wherein each of the first weight map and the second weight map indicate a weight of one of the first image and the second image in the generation of the third image, and
wherein the third image is generated by weighted-averaging the first image and the second image using the third weight map.

11. The storage medium according to claim 10, wherein the second image is generated by sharpening the first image using a machine learning model.

12. A storage medium storing a program for causing a computer to execute an image processing method, the image processing method comprising:
sharpening a first image to generate a second image;
generating a first weight map based on the first image;
generating a second weight map based on the second image; and
generating a third image based on the first image, the second image, the first weight map, and the second weight map,
wherein each of the first weight map and the second weight map indicate a weight of one of the first image and the second image in the generation of the third image,
wherein the method further comprises generating an intermediate corrected image based on the first image, the second image, and the first weight map, and wherein the third image is generated based on the first image, the second weight map, and the intermediate corrected image.

13. An image processing apparatus comprising:

at least one memory device that stores a set of instructions; and at least one processor that executes the set of instructions to execute an image processing method comprising:

sharpening a first image to generate a second image;

generating a first weight map based on the first image;

generating a second weight map based on the second image;

generating a third image based on the first image, the second image, the first weight map, and the second weight map; and generating a third weight map based on the first weight map and the second weight map, wherein each of the first weight map and the second weight map indicate a weight of one of the first image and the second image in the generation of the third image, and wherein the third image is generated by weighted-averaging the first image and the second image using the third weight map.

14. The apparatus according to claim 13, wherein the second image is generated by sharpening the first image using a machine learning model.

15. An image processing apparatus comprising:

at least one memory device that stores a set of instructions; and at least one processor that executes the set of instructions to execute an image processing method comprising:

sharpening a first image to generate a second image;

generating a first weight map based on the first image;

generating a second weight map based on the second image;

generating a third image based on the first image, the second image, the first weight map, and the second weight map; and generating an intermediate corrected image based on the first image, the second image, and the first weight map, wherein each of the first weight map and the second weight map indicate a weight of one of the first image and the second image in the generation of the third image, and wherein the third image is generated based on the first image, the second weight map, and the intermediate corrected image.

16. An image processing system comprising:

an image processing apparatus according to claim 13; and a control apparatus configured to communicate with the image processing apparatus, wherein the control apparatus includes a unit configured to transmit a request to execute processing on the first image to the image processing apparatus.

\* \* \* \* \*